O. L. ROUTT.
MEANS FOR MAKING PLASTER BOARD.
APPLICATION FILED JUNE 30, 1919.
1,348,898.
Patented Aug. 10, 1920.
Fig. 2
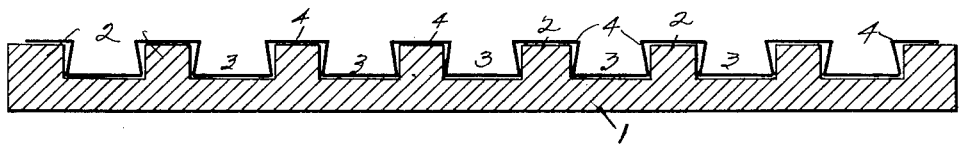
Fig. 3
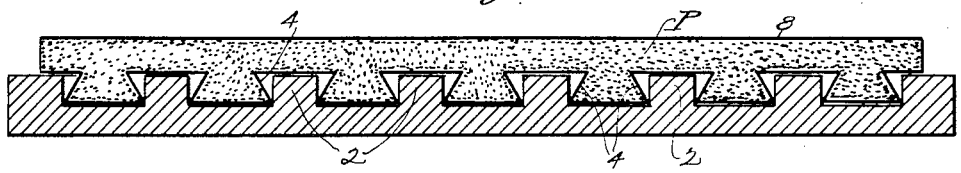
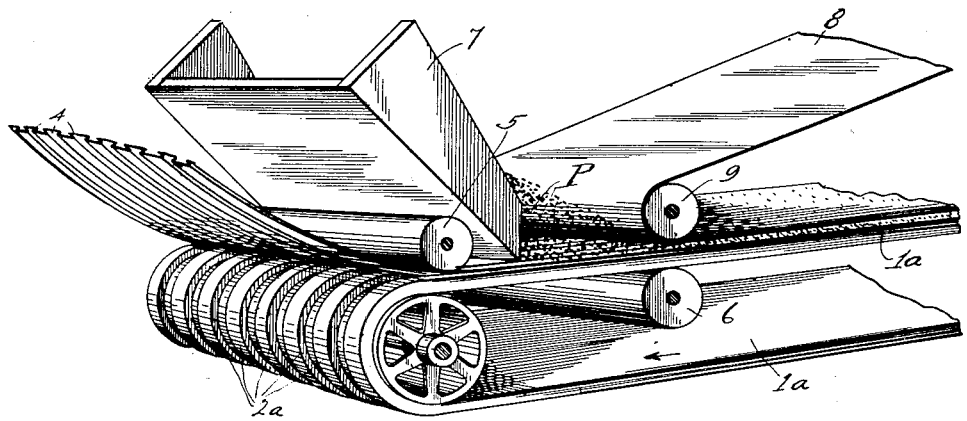
Fig. 1
Inventor:
ORVILLE L. ROUTT

UNITED STATES PATENT OFFICE.

ORVILLE L. ROUTT, OF LOS ANGELES, CALIFORNIA, ASSIGNOR TO PLASTOID PRODUCTS, INCORPORATED, OF LOS ANGELES, CALIFORNIA, A CORPORATION OF CALIFORNIA.

MEANS FOR MAKING PLASTER-BOARD.

1,348,898.   Specification of Letters Patent.   Patented Aug. 10, 1920.

Application filed June 30, 1919. Serial No. 309,223.

*To all whom it may concern:*

Be it known that I, ORVILLE L. ROUTT, a citizen of the United States, residing in the city of Los Angeles, county of Los Angeles, and State of California, have invented certain new and useful Means for Making Plaster-Board, of which the following is a specification.

My invention relates to plaster board and more particularly to improved means for molding plaster board having parallel strips or tongues, wider at their outer surfaces than they are at their inner or attached sides, thus forming channels between said strips or tongues which are wider at their inner or bottom portions than they are at their outer or top portions. In other words, said channels have restricted openings thereinto and as plastic material is applied to said plaster board it is molded into said channels and becomes interlocked therewith, in a well known manner.

My improved means for forming such channels in plaster board as it is made is most simple, practical and economical and avoids the necessity of having separable molding tongues removable in parts after the plaster board has been formed. This kind of molding means requires more or less complicated and expensive machinery. With my new and novel means I am able to remove the formed plaster board from the mold in the simplest possible manner, for it lifts or moves straight out of the molding base, thus making it possible to make the board with a more or less continuous operation.

Broadly considered, my new means comprises a base or bearing member having spaced parallel strips or tongues, forming channels therebetween having substantially straight, parallel opposite sides, into which I place a folded paper molding sheet which receives the soft plastic material and molds it into the desired form, said paper adhering to and becoming the surface of the finished plaster board.

In order to fully explain my invention, I have shown one practical embodiment thereof in the accompanying sheet of drawings, which I will now describe.

Figure 1 is a fragmentary perspective view of one combination of forming elements, the elements here shown being movable;

Fig. 2 is a cross sectional view of a mold or bearing member with my folded paper mold applied thereto; and Fig. 3 is a cross sectional view of a finished plaster board and the forming base or bearing member.

In Fig. 2 a molding base or bearing member 1 is shown in cross section with strips or tongues 2, spaced apart, forming square channels 3 therebetween. The paper which forms the surface of the finished plaster board, that is, the surface which has the channels in and which receives the plastering material, is folded in the manner indicated at 4, and may be rolled or cut in sheets of the proper size as desired. Referring to Fig. 1, the molding base or bearing member 1 is shown in the form of a wide belt, 1ª, with spaced strips 2ª. The folded paper 4 is fed thereto, under a roller 5. The folded paper thus fits into the channels 3 and over the tongues or strips 2, as indicated in the cross sectional view, Fig. 2. A bearing roller 6 underlies the belt 1ª, as indicated. The plastic material of which the board is formed is fed from a hopper or chute, 7, on to the folded paper as it rests in the channels of the belt, as indicated, said material filling the space formed by the folds in the paper as the belt and paper advance. A covering sheet, 8, is fed around a roller 9, above the roller 6. This roller 9 presses the plastic material P into the folds of the paper 4, between the strips 2, 2, as clearly illustrated by Fig. 3, and at the same time applies the top sheet 8 thereto. The pressure between the rollers 6 and 9 is sufficient to fill the folds of the paper 4, in the channels 3 of the molding base, with the plastic material P without materially distorting or crumpling the paper as folded to receive the soft plastic material. The finished product is substantially as illustrated in the cross sectional view, Fig. 3, and is easily removed from the bearing or holding base 1, or 1ª, as the case may be.

What I claim is:

1. Means for forming plaster board having spaced parallel channels therein comprising a base member having spaced strips forming channels therebetween, and adapted to support paper folded to form channels and placed upon said base member with its folded portions in the channels of said base member, and means for filling the paper channels with plastic material.

2. Means for forming plaster board having spaced parallel channels therein comprising a base member having spaced portions forming channels therebetween, said channels having substantially straight opposite sides, and adapted to support paper folded to form receiving channels, substantially as shown, and adapted to be placed upon said base with the folded portions resting in said base channels and over said spaced portions, and means for feeding plastic material into said paper folds and compressing the same.

3. Means for forming plaster board having spaced channels therein for interlocking with plastering material applied thereto comprising a supporting base having spaced tongue portions adapted to support a combination mold and covering sheet folded to form said channels, and means for feeding and pressing plastic material into said channels and causing the same to adhere to said paper molding sheet.

4. Means for forming plaster board having spaced parallel channels therein, longitudinally thereof, comprising a base or bearing member having spaced tongue portions forming channels therebetween with straight parallel sides, and adapted to support a sheet of paper folded to form spaced channels having restricted openings thereto and adapted to be placed on said bearing member, means for feeding plastic material to said channels, and means for applying a sheet surface to the opposite side of said plaster board as it is formed, substantially as described.

5. Means for forming plaster board having spaced parallel channels therein comprising a base member having spaced longitudinal portions to serve as bearing members, and adapted to support paper folded longitudinally with its folds spaced to correspond with said longitudinal portions of said base member, whereby said folded paper overlies said portions and also has folded portions between said longitudinal base portions, and means moving longitudinally over and upon said base portion and folded paper for pressing plastic material into the folds of said paper longitudinally thereof.

6. Means for forming plaster board having surface holding portions, comprising a base member having receiving pockets or openings adapted to receive and support paper formed with extension portions adapted to extend down into said pockets or openings when said paper form is placed thereupon, and means for filling said paper form and covering the same with plastic material, substantially as described.

7. Means for forming plaster board having spaced, parallel interlocking portions whose outer sides are wider than their attached sides, comprising a supporting member having therein spaced channels whose opposite sides are substantially straight and at right angles to the bottoms of said channels, and adapted to support a sheet of paper folded into channel forming shape and means for applying plastic material to said folded paper as its folds rest in the channels of said supporting member, said means being adapted to be moved relative to said supporting member, longitudinally of said folds.

Signed at Los Angeles, Los Angeles county, California, this 2 day of June, 1919.

ORVILLE L. ROUTT.

In presence of—
WILLIAM R. LITZENBERG,
H. M. BRUNDAGE.